(12) United States Patent
Kohlenberg et al.

(10) Patent No.: US 7,201,586 B2
(45) Date of Patent: Apr. 10, 2007

(54) HOUSING FOR FASTENING OF ELECTRICAL AND/OR ELECTRONIC POWER COMPONENTS TO A CIRCUIT BOARD

(75) Inventors: Thomas Kohlenberg, Paderborn (DE); Eckerhardt Grieb, Hagen (DE)

(73) Assignee: Demag Cranes & Components, GmbH, Wetter (DE)

( * ) Notice: Subject to any disclaimer, the term of this patent is extended or adjusted under 35 U.S.C. 154(b) by 0 days.

(21) Appl. No.: 10/905,147

(22) Filed: Dec. 17, 2004

(65) Prior Publication Data
US 2005/0136705 A1 Jun. 23, 2005

(30) Foreign Application Priority Data
Dec. 23, 2003 (DE) .................. 103 61 452

(51) Int. Cl.
H01R 12/00 (2006.01)
H05K 1/00 (2006.01)
(52) U.S. Cl. ..................... 439/76.2; 439/76.1
(58) Field of Classification Search ............... 439/76.2, 439/76.1, 716, 78
See application file for complete search history.

(56) References Cited
U.S. PATENT DOCUMENTS

| | | | | |
|---|---|---|---|---|
| 4,408,817 A | * | 10/1983 | Mattis | 439/620 |
| 4,959,018 A | * | 9/1990 | Yamamoto et al. | 439/76.1 |
| 5,018,192 A | * | 5/1991 | Smith | 379/106.03 |
| 5,023,752 A | * | 6/1991 | Detter et al. | 361/752 |
| 5,253,143 A | | 10/1993 | Klinger et al. | |
| 6,031,726 A | * | 2/2000 | Vinciarelli et al. | 361/761 |
| 6,077,102 A | * | 6/2000 | Borzi et al. | 439/364 |
| 6,129,598 A | * | 10/2000 | Yu et al. | 439/883 |
| 6,319,018 B1 | * | 11/2001 | Daoud | 439/65 |
| 6,322,375 B1 | * | 11/2001 | Cole et al. | 439/76.1 |
| 6,623,281 B2 | * | 9/2003 | Vinciarelli et al. | 439/78 |
| 6,802,737 B2 | * | 10/2004 | Bergner et al. | 439/532 |

FOREIGN PATENT DOCUMENTS

| | | |
|---|---|---|
| DE | 717067 | 2/1942 |
| DE | 36 13 863 A1 | 4/1986 |
| DE | 94 15 823 U1 | 12/1994 |
| DE | 297 10 415 U1 | 12/1997 |
| EP | 1 369 305 A2 | 12/2003 |
| GB | 2 171 846 A | 9/1986 |

OTHER PUBLICATIONS

European Search Report completed Apr. 28, 2005, from corresponding European Application No. EP 04 02 9406.

* cited by examiner

*Primary Examiner*—Hae Moon Hyeon
(74) *Attorney, Agent, or Firm*—Van Dyke, Gardner, Linn & Burkhart, LLP

(57) ABSTRACT

The invention concerns an arrangement for fastening of electrical and/or electronic power components to a circuit board, wherein the electrical and/or electronic power components (8) are mechanically and removably fastened to the board (6). The power components (8) have plug and/or terminal connection elements (8*a*) for their electrical connection and can be connected electrically to the board (6) via electrical lines, preferably with plug and/or terminal strips (13) arranged on the board (6).

13 Claims, 9 Drawing Sheets

HOUSING FOR FASTENING OF ELECTRICAL AND/OR ELECTRONIC POWER COMPONENTS TO A CIRCUIT BOARD

BACKGROUND OF THE INVENTION

The invention concerns an arrangement for fastening of electrical and/or electronic power components to a circuit board. The invention also concerns a housing to accommodate electrical and/or electronic power components, especially to accommodate the control and power components. The invention is especially useful with a lifting mechanism.

It is generally known from the state of the art that machines driven by electric motor, such as lifting mechanisms, are provided with an electrical box. In the electrical box are arranged electrical and/or electronic control and power components, essentially providing the power supply and the control of the electric motors, such as the lifting and traveling motors of lifting mechanisms. These control and power components also have the task of providing optional additional functions, such as a monitoring of control and/or end switches, an evaluating of sensors, or an actuating of a signaling device, such as a signal horn.

The power components used are typically electromechanical components, such as contactors, for switching the power supply currents of the electric motors, as well as reversing starters, pole changing starters, power protection switches, motor protection switches, fuses for voltage ratings, and transformers. The control components are usually formed from electronic components. The power components are predominantly wired in conventional manner and electrically connected by such wiring to the electronic components of the controls, located in separate small housings.

In a so-called housing-type electrical box, the entire electrical system of the machine is accommodated, in order to protect it against environmental factors in the form of moisture or inclement weather. Furthermore, the electrical box protects people, who might come in contact with the electrical section when attending the device, from an electric shock. The electrical box has a cover and can be opened and closed in order to install the electrical section and also to maintain it later on. The covers are usually screwed together with the electrical box and their only purpose is to close and seal off the electrical box. The electrical box has a sheet metal construction, as is familiar from switch cabinets, or a plastic construction. The electrical installation is accommodated or fastened in the electrical box by means of so-called top hat rails. With this technique, the individual components and terminal strips are snapped onto appropriately shaped, standardized top hat rails and then wired together in conventional manner. In this construction, special requirements have to be observed for the electrical insulation. Maintaining the insulation category and the required clearances and creep paths requires corresponding expense. Plastic constructions have the advantage here of making it easier to observe the required insulation categories.

The connection of the electrical installation to the electrical components of the machine, especially the lifting mechanism, and to the outside power supply and the control lines, is done by cables, which are led in sealed manner into the electrical housing and connected there to screw or terminal contacts by appropriate terminal strips.

The known solutions do not offer the possibility of easily replacing the entire electrical installation. Accordingly, the electrical installation can only be maintained or repaired in a costly manner. Furthermore, the above-described construction of the electrical system is usually very large and consists of many components difficult to install. Therefore, much labor is involved and the work is accordingly wage-intense.

Furthermore, from German Patent Application DE 36 13 863 A1 there is known a fastening device for electrical components, especially a motor choke for noise suppression and/or current dampening in electrical appliances, on a carrier board. The motor choke is configured as a toroidal core choke with two toroidal cores and a corresponding electrical winding. The electrical component has a housing, from which fastening and locking means extend at the side facing the carrier board, especially a circuit board or printed board. These fastening and locking means consist essentially of a detent leg and a fixation leg, each of them extending from the housing of the electronic component in the direction of the carrier board. The detent leg is divided into a web extending from the housing and a detent lug arranged at its free end. The carrier board has openings arranged corresponding to the cross section of the detent lug, into which the detent legs are inserted and locked there by the detent lug grabbing the carrier plate from behind with spring action. The fixation leg situated next to each detent leg has the task of serving as an abutment to the detent lug and thus establishing the distance between the housing and the carrier board, and also penetrating into the opening of the carrier board for the detent lug and thus locking the detent lug. The fastening and locking means are uniformly distributed about the periphery of the housing; for example, there are six fastening and locking means provided in the round housing of the motor choke. Correspondingly, there are six openings provided in the carrier board. After the electrical component has been fixed on the carrier board, its connection line already stripped of insulation is inserted into a designated borehole of the carrier board and soldered together with it.

Moreover, from German Patent DE 717 067 there is known a device for fastening a coil shell, especially for high-frequency coil sets of radio receivers, on a corresponding base plate. For the fastening, the coil shell is inserted into a slit ring, having an eccentric peripheral surface. The base plate has a borehole to receive the ring, being likewise eccentric. Thus, by twisting the ring in the borehole, one can firmly clamp the coil shell in the borehole via the ring.

SUMMARY OF THE INVENTION

The present invention provides an arrangement for the fastening of electrical and/or electronic power components on a board, as well as a housing to accommodate electrical and/or electronic components, especially to accommodate the control and power components for a lifting mechanism, with the aforesaid arrangement, which facilitates the installation and maintenance of the electrical and/or electronic components.

This problem is solved by an arrangement for the fastening of electrical and/or electronic power components on a board with the features of Claim 1. Advantageous configurations of the invention are indicated in the subsidiary claims.

According to the invention, in an arrangement for fastening of electrical and/or electronic power components on a board, such as a circuit board, wherein the electrical and/or electronic power components are fastened mechanically and removably on the board, an easier mounting and maintenance is achieved in that the power components have plug and/or terminal connection elements for their electrical connection and can be connected electrically to the board via electrical lines with preferably plug-in and/or terminal strips arranged on the board. The structural unit thus created, also comprising the power components, is easily manipulated as a whole. Since the electrical and/or electronic power components are wired by electrical lines to the board, these wires do not have to be loosened for a replacement of the entire board.

According to a first embodiment, recesses are arranged in the board, into which electrical and/or electronic power components are mechanically and removably inserted and whose dimensions are adapted to the outer dimensions of the electrical and/or electronic power components. Thus, the possibility exists of connecting the most diverse electrical and/or electronic power components to a board, thereby creating a structural unit which can be preassembled for the installation and completely replaced on site in the event of maintenance or repair. The recesses serve as especially simple form-fitting holders for the electrical and/or electronic power components, which are usually arranged on top hat rails outside the board and not connected by electrical lines to other electrical and/or electronic components arranged on the board until the time of mounting on the board. Thus, the electrical and/or electronic power components rest with a slight play between their outer wall and the inner edge of the recess.

In a second embodiment, the familiar top hat rail is arranged directly on the board, and then the electrical and/or electronic power components are mechanically and removably fastened to it. Here as well, the above-described advantageous structural unit is created. In departure from the state of the art, the top hat rail here is arranged directly on the board, which itself serves exclusively to accommodate the electrical and/or electronic control components.

In the sense of the present invention, by power components is meant connectors for switching the power supply currents of electric motors, reversing starters, pole changing starters, power protection switches, motor protection switches, fuses for rated voltages, and transformers. As compared to other electrical and/or electronic components, especially control components, the power components are essentially characterized in that they have a weight greater than 100 to 200 g, are usually larger than 40×40×50 mm, the electrical connection is by plug or screw connections, and a snap mechanism or boreholes for screws are provided for mechanical fixation to top hat rails. The power components are also usually more complex in nature and thus have several structural parts and their own housing.

In especially advantageous manner, the electrical and/or electronic power components are held removably in the recesses or on the top hat rail by snap-on connections.

This board is especially suitable for installation in a housing to accommodate electrical and/or electronic components, in particular, to accommodate the control and power components for a lifting mechanism. In this case, the board is then supported, at least in the region of the recesses or the top hat rails, by support elements which are connected to the housing. Thus, a traditional board can also be used to carry heavy power components. The board then has the necessary stability by resting on the support elements.

In a preferred embodiment, the support elements are arranged on the inside of the cover plate of the housing and are pin-shaped, and the board and the electrical and/or electronic components are separated from the cover plate of the housing by the support elements.

Preferably, the housing consists of a tub-shaped bottom piece and a tub-shaped cover and the board is arranged in the cover. The cover is hinged to the bottom piece by a joint and can be removed from the bottom piece via the joint. This design makes it possible to loosen the cover with the board from the machine for installation purposes.

This is supported by the fact that at least one female connector and at least one plug-in and/or terminal strip are arranged on the board, by which the board can be connected to electrical and/or electronic control and power components in the bottom piece of the housing and to electrical consumers outside the housing.

To further facilitate the installation, the female connector of the board is accessible from the outside through an opening in the housing.

Since the housing is made from an electrically non-conducting material and an injection-molded plastic piece, the requirements for electrical insulation can be easily fulfilled.

BRIEF DESCRIPTION OF THE DRAWINGS

The invention shall now be explained more closely by means of a sample embodiment depicted in a drawing.

DETAILED DESCRIPTION OF THE PREFERRED EMBODIMENT

Figure 1:
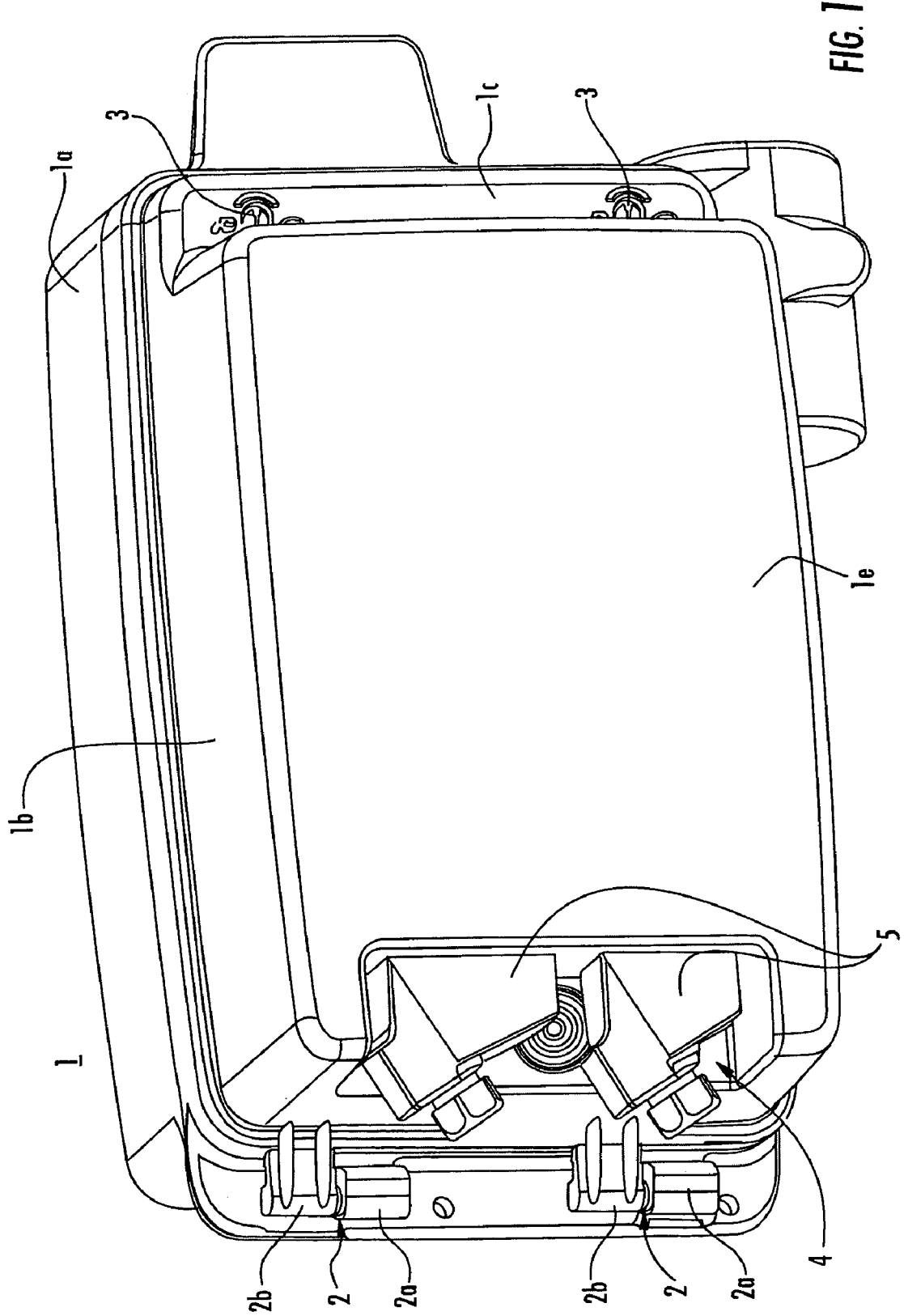
FIG. 1 is a perspective view of a housing to accommodate electrical and/or electronic components, especially to accommodate the control and power components of a lifting mechanism.

Referring now to the drawings and the illustrative embodiments depicted therein, FIG. 1 shows a perspective view of a housing 1 to accommodate electrical and/or electronic components in the form of control 7 and power 8 components (see FIGS. 3 and 6) for a lifting mechanism (not shown). The housing essentially consists of a box or hood-shaped bottom piece 1a, which is closed by a likewise box or hood-shaped cover 1b with its opening turned toward the bottom piece 1a. The bottom piece 1a is also partly an integral component of the lifting mechanism, as in the presented solution. The cover 1b is movably fastened to the bottom piece 1a by a hinge-like joint 2. The joint 2 is configured such that the cover 1b can be removed from the bottom piece 1a for installation or repair purposes. Then, the connection pin (not shown) usually remains in one eye of the first joint piece 2a and slides out from the other eye of the second joint piece 2b. At the side of the cover 1b opposite the two spaced-apart joints 2, in the region of a flange-like shoulder 1c, there are arranged two spaced-apart lock elements 3, by which the cover 1b can be removably connected to the bottom piece 1a.

Furthermore, at the side of the cover 1b in the region of a narrow side wall of the cover 1b and the adjoining cover plate 1a, there is provided a cuboidal recess 4, which is large enough to accommodate plug elements 5 of a line (not shown) at least partly inside the outer contour of the housing 1.

Figure 2:
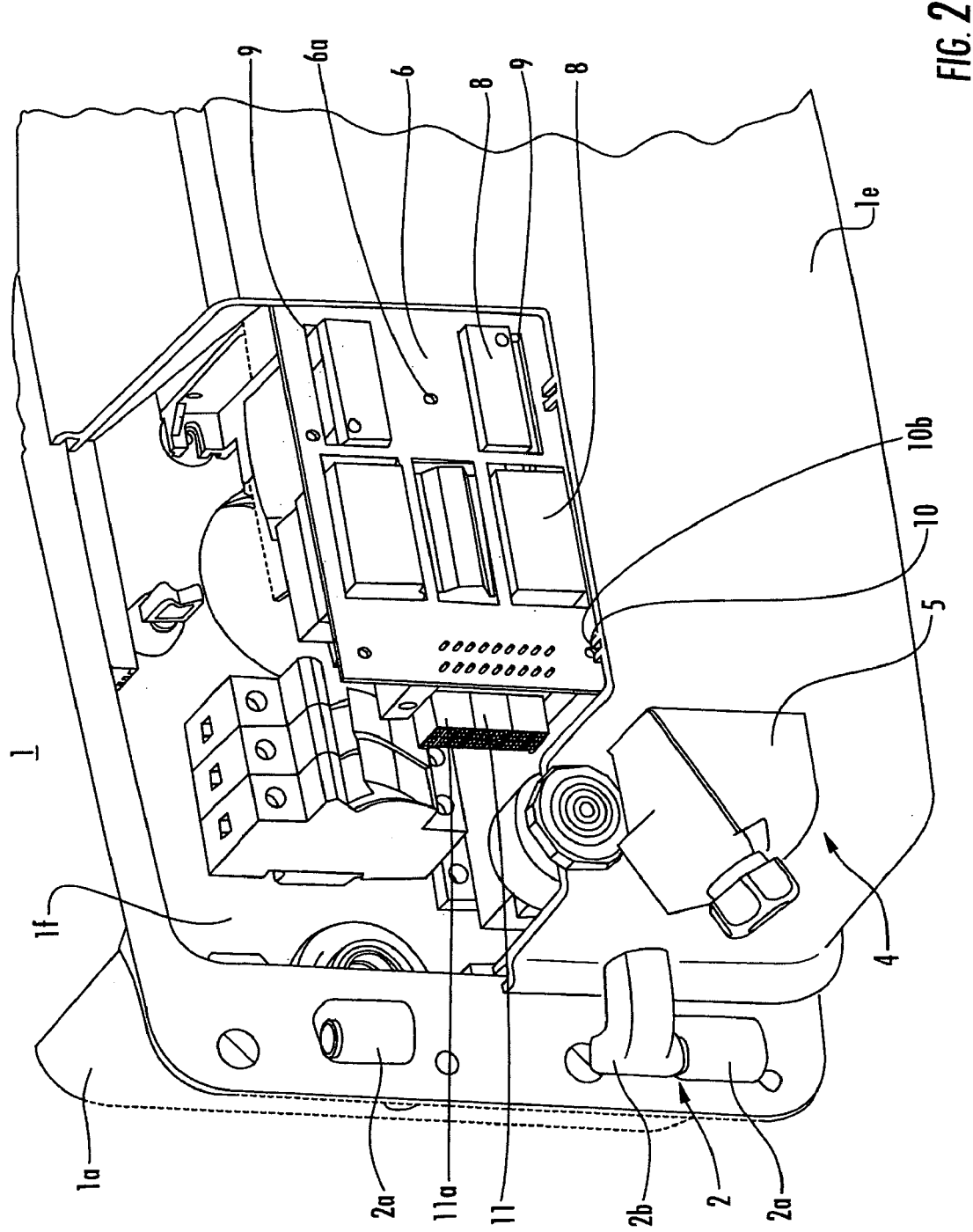
FIG. 2 is a perspective view of the housing in FIG. 1 with a portion of the cover cut-away to illustrate internal components.

FIG. 2 shows a perspective view of a cutout of the housing 1 per FIG. 1 from the region of the joint 2. Here, the cover 1b configured according to a first embodiment of the invention is shown broken open in the region of one of its corners, in order to afford a glimpse into the interior 1f of the housing 1. It can be seen that a circuit board, or board, 6 rests against the inside of the cover plate 1e, carrying, in addition to electronic control components 7 (see FIG. 3), electromechanical power components 8 such as contactors for switching the power supply current of an electrical consumer in the form of an electric motor (not shown). In order to fasten the power components 8 to the board 6, essentially rectangular recesses 9 are provided in the board 6, whose dimensions are adapted to the outer dimensions of the power components 8. The power components 8 are removably held in the recesses 9 of the board 6 by clamp or snap-on connections (not shown). Thus, the snap-on connections engage with two opposite inner edges of the recess 9. A sideways guiding of the power component 8 is then done by means of the two remaining inner edges of the recess 9.

The board 6 may be made from thin, fiberglass-reinforced, duroplastic material. In order to steadily support the heavy power components 8 in operation, the board 6 is supported in many places against the inside of the cover plate 1e by support elements 10. The support elements 10 are configured as fastening pins and extend at right angles to the inside of the cover plate 1a. These support elements 10 are specially dimensioned for thread-forming screws and adapted to a production of the cover 1b as an injection-molded plastic piece. The board 6 is provided with boreholes 6a, into which can be inserted the pin-shaped extensions 10a of the support elements 10, which taper upwards in step manner. Thanks to the step-like configuration, the support element 10 has an annular bearing surface 10b, on which the bottom side of the board 6 then rests. The pin-like extensions 10a of the support elements 10 serve for the lateral fixation of the board 6. The board 6 is fastened to the support element 10 either by a screw (not shown), or the end of the pin-shaped extensions 10a of the support elements 10, facing away from the cover plate 1e, is provided with a detachable snap-on connection. The distribution of the support elements 10 on the cover plate 1e in relation to the board 6 is chosen so that the heavy power components 8 can also be supported with low vibration when the machine is in operation and the board 6 is optimally supported. The entire electrical installation is connected to the housing 1 by these support elements 10 at several form-fitting locations. Thus, the forces of inertia of the power components 8 can be effectively diverted into the cover 1b.

Furthermore, FIG. 2 shows that two plug sockets 11, one of which is visible, in a marginal region of the board 6 bordering on the recess 4 of the cover 1b are inserted by their solder tags into corresponding boreholes in the board 6 and soldered to it. There are two window-like openings 12 provided in a side wall of the recess 4, through which the socket part 11a of the plug sockets 11 protrudes outward, where it accommodates a mating plug element 5. These plug sockets 11 serve to electrically connect the board 6 via the plug elements 5 to the electrical consumers being actuated, in the form of the electric motors of the lifting mechanism (not shown), in a removable manner. For this, the plug element 5 is configured such that when the plug element 5 is mated with the plug socket 11, the plug element 5 seals off the outside of the cover 1b and thus seals off the opening 12 of the plug socket 11.

Figure 3:
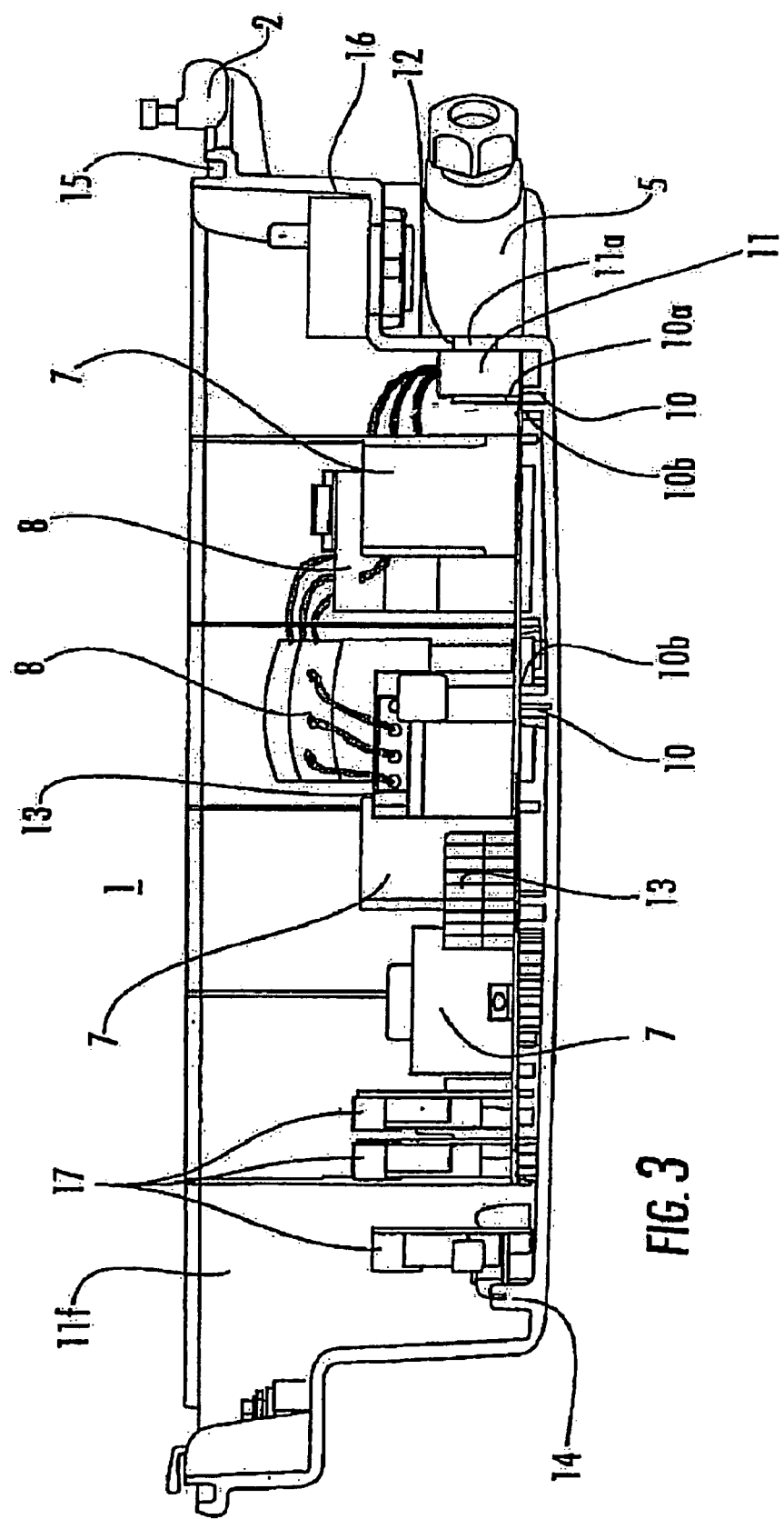
FIG. 3 is a sectional view through the cover of FIG. 2.

FIG. 3 shows a cross section through the cover 1b of the housing 1. As can be clearly seen, the board 6 rests on the support elements 10 and is thus spaced away from the inside of the cover 1b. The power components 8 protrude slightly—preferably a few millimeters, i.e., 1–5 mm—downward through the recesses 9 in the direction of the inside of the cover 1b. This is enough to provide the power components 8 a side support. The bottom side of the board 6 is around 6 to 8 mm away from the inside of the cover 1b. It is also shown how the socket part 11a of the plug socket 11 protrudes through the opening 12 from the interior 11f of the housing 1.

Figure 4:
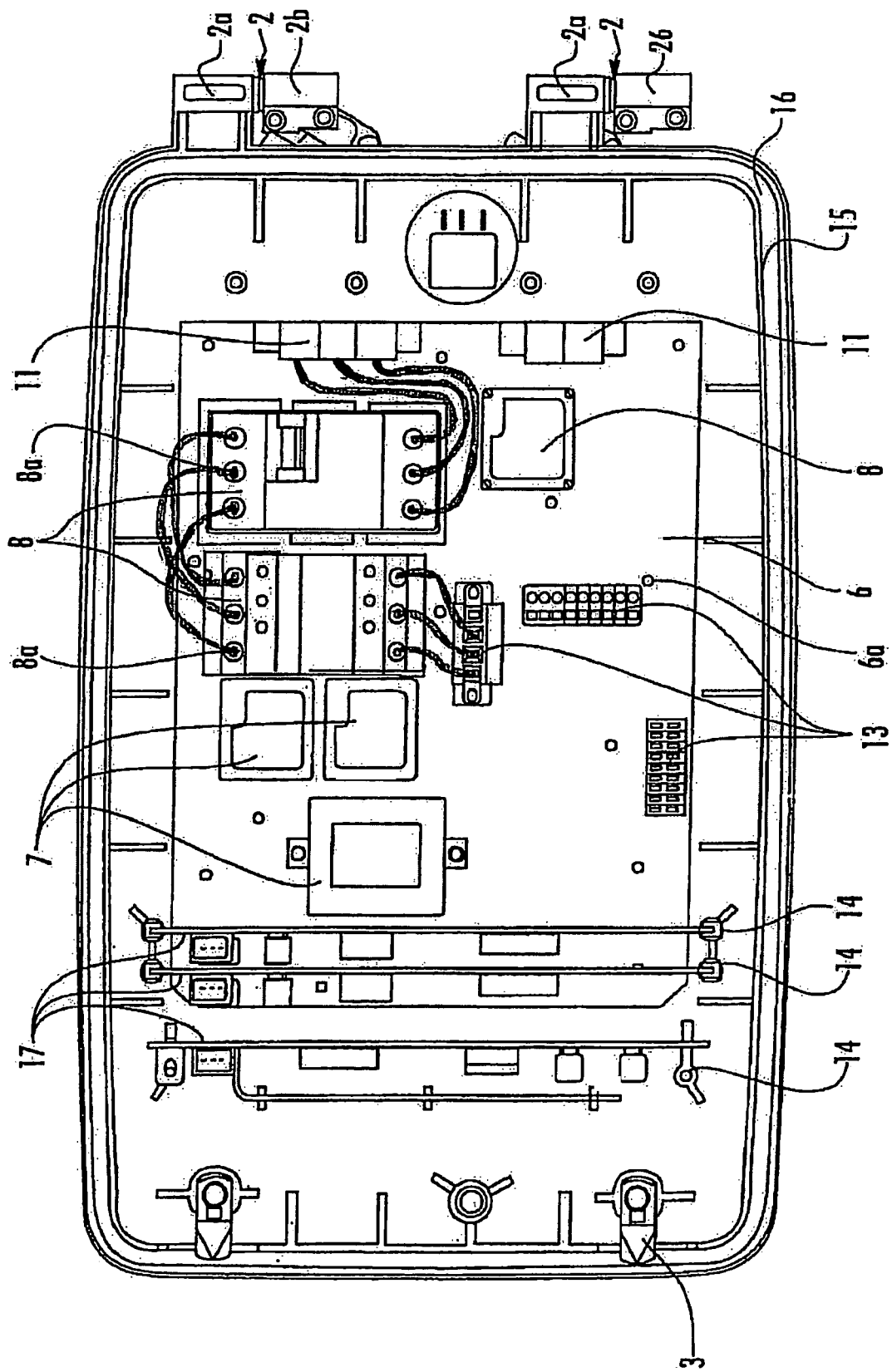
FIG. 4 is a top plan view of the inner region of the cover of FIG. 2.

FIG. 4 shows a top view of the inside of a cover 1b and, thus, the board 6. The power components 8 rest in the recesses 9 on the board 6 and are hard-wired with it in the necessary manner to form a structural unit with the board. For this, the power components 8 have plug and/or terminal connection elements 8a, which are connected via electrical lines to plug and/or terminal strips 13 soldered on the board. It is also possible to solder the electrical lines directly to the board 6 without the plug and/or terminal strips 13; the main thing is that the plug and/or terminal connection elements 8a remain intact. In order to connect the board 6 electrically to other structural parts or an energy source, additional plug and/or terminal strips 13 are present on the board 6, being correspondingly connected electrically to the power components 8, the plug sockets 11 and the control components 7. In this case, the control components 7 are already hooked up to each other via the board 6, so that only the surface-mounted power components 8 have to be electrically connected to the plug and/or terminal strips 13. But the overall board 6 can be prepared in this way ready for installation and only has to be connected via the plug sockets 11 and the plug and/or terminal strips 13. Also, due to the comprehensive use of plug connections for connections within the housing between the structural parts in the bottom piece 1a and in the cover 1b of the housing 1, and also to the electrical consumers of the lifting mechanism on the outside, and the consistent elimination of screw or clamp connections at these points, the central part of the electrical installation in the form of the board 6 can be easily installed or replaced during a servicing call.

The cover 1b also has holders 14, where plug-in cards 17 can be removably fastened, in order to expand the range of functions of the board 6 as required. The holders 14 are easy to produce in injection molding.

Furthermore, the cover 1b has a circumferential groove 15, to receive a gasket 16 with an annular cross section. By this gasket 16, the bottom piece 1a can be sealed off via the cover 1b.

Figure 5:
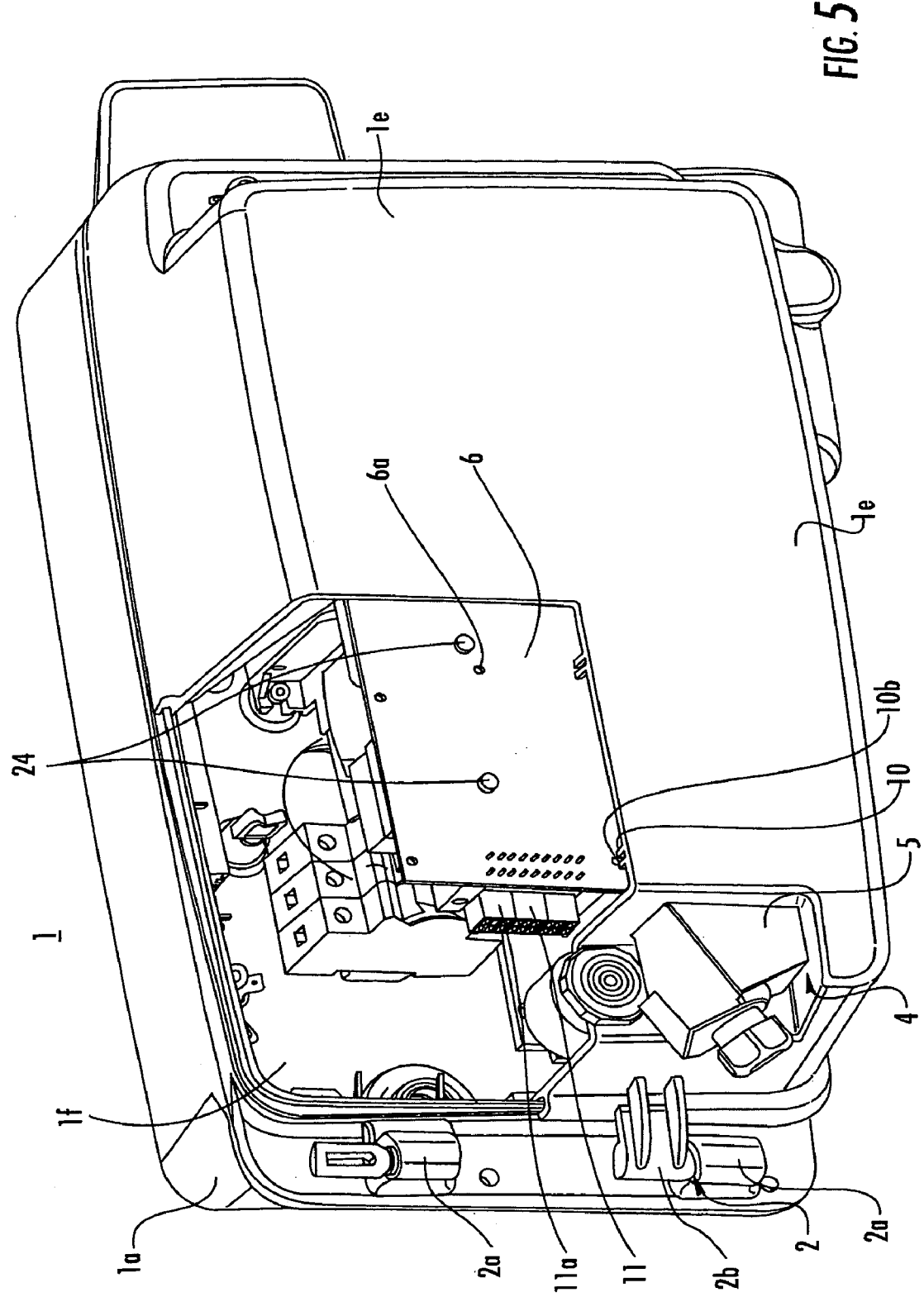
FIG. 5 is a perspective view of a housing per FIG. 1 with a portion of the cover to illustrate internal components of an alternative embodiment.
Figure 6:
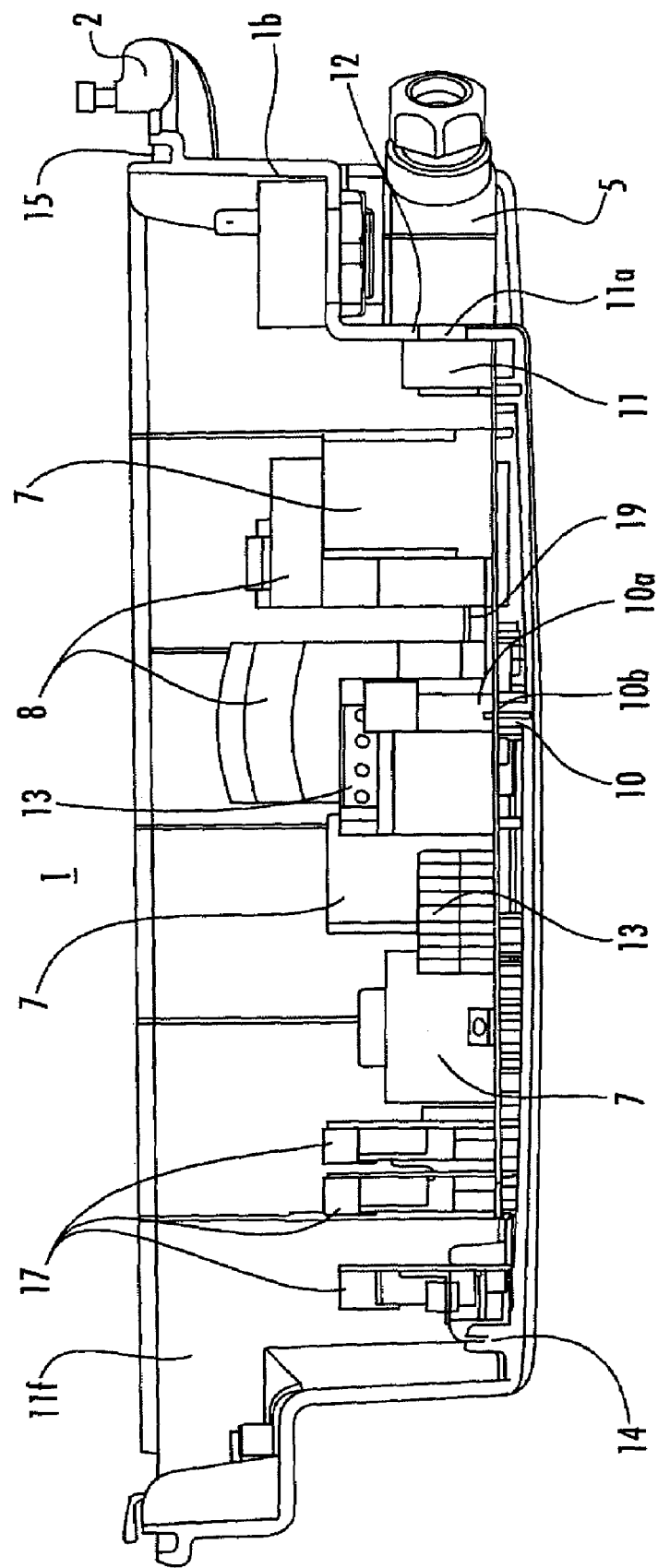
FIG. 6 is a sectional view through the cover of FIG. 5.
Figure 7:
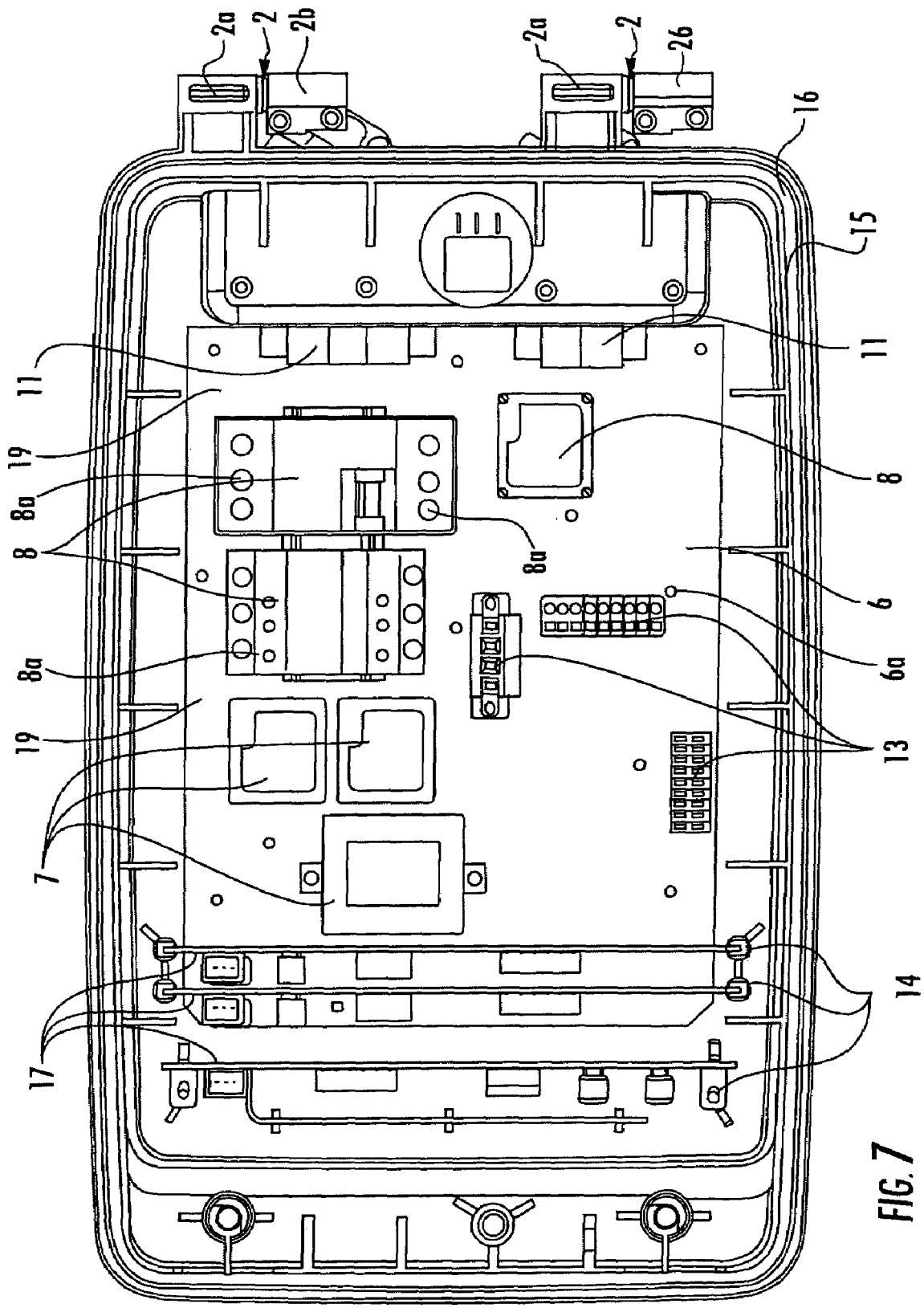
FIG. 7 is a top plan view of the inner region of the cover in FIG. 5.

FIGS. 5 to 7 show the cover 1b, especially the board 6 attached to it, in a second configuration. Only the differences from the first configuration per FIGS. 2–4 shall be described now, otherwise referring to the preceding description.

FIG. 5 shows the housing of FIG. 1 with partly cutaway cover 1b. As compared to the first configuration, the power components 8 here are not secured in recesses 9 of the board 6, but instead on a top hat rail 19 (see FIGS. 6 and 7) by the usual snap connections. FIG. 5 shows only the ends of the two fastening screws 24 from underneath, which attach the top hat rail 19 to the top surface of the board 6. It is not shown how an elastic element, preferably in the form of a disk, is provided between the bottom side of the top hat rail 19 and the top side of the board 6, thereby compensating for vibrations of the power components 8 occurring during operation. The elastic element, thanks to an appropriate sleeve-like configuration, also achieves an electrical insulation of the fastening screws 24 relative to the top hat rail 19, and an insulation of the top hat rail 19 relative to the board 6.

In FIG. 6, which shows a cross section through the cover 1b of FIG. 5, one recognizes a short segment of the top hat rail 19. The rest of the top hat rail 19 is concealed by the power components 8 fastened to it.

Also FIG. 7, in which a top view of the inner region of the cover 1b per FIG. 5 is represented, shows only the regions of the top hat rails 19 not concealed by the power components 8.

Figure 8:
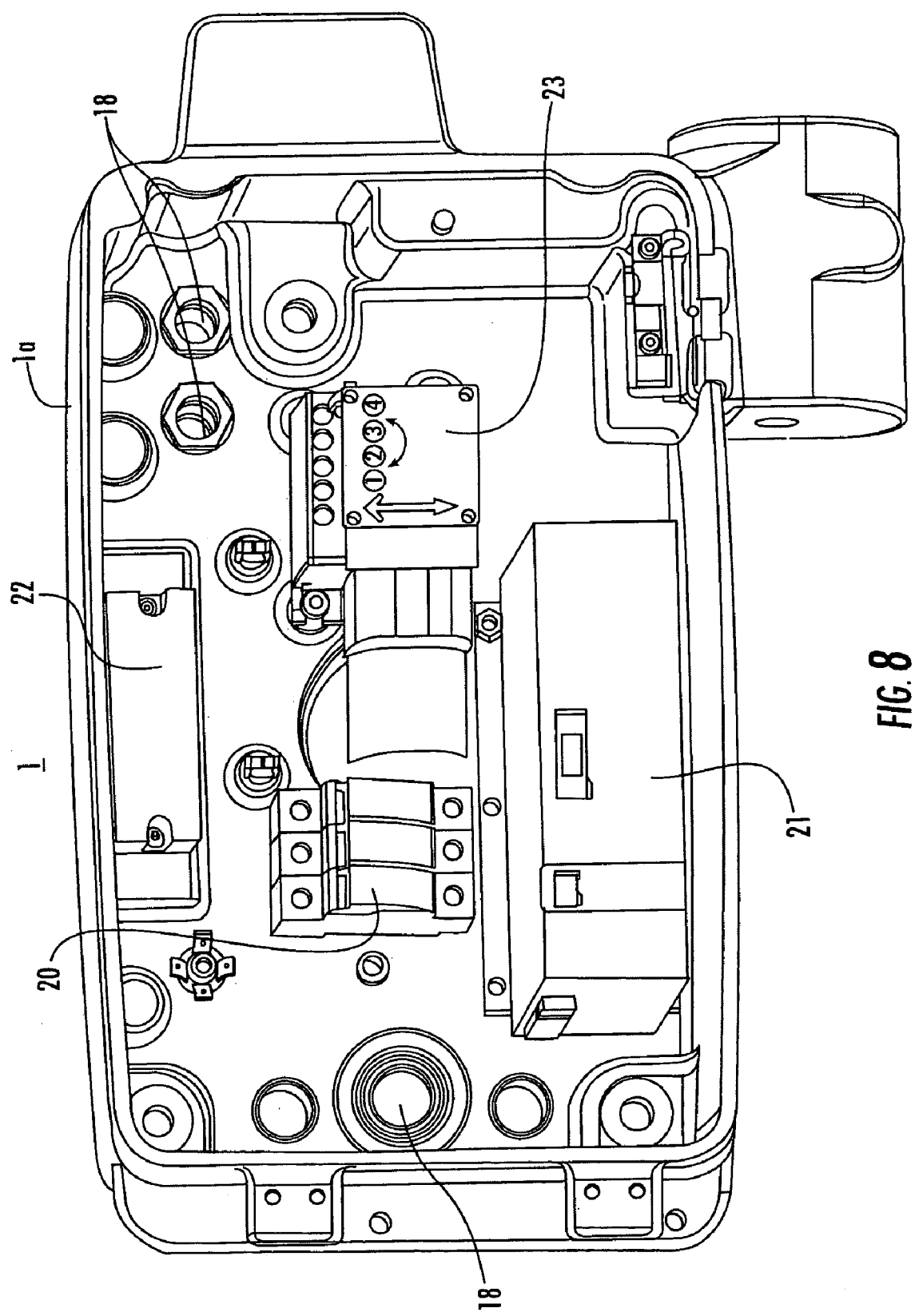
FIG. 8 is a top view of the inner region of the bottom piece of the housing in FIG. 1.

FIG. 8 represents a top view of the bottom piece 1a of the housing 1. On the floor of the bottom piece 1a, electrical components are fastened, such as automatic circuit breakers 20, a frequency converter 21, a braking resistor 22 and a transmission limit switch 23, being connected via lines (not shown) with plugs to the plug and/or terminal strips 13 of the board 6 or to other electrical and/or electronic structural parts. The bottom piece 1a is connected as an integral component to the lifting mechanism and power supply and/or control lines (not shown) enter through bottom openings 18 into the interior of the housing 1.

In the previously described sample embodiment, the housing 1 with its bottom piece 1a and its cover piece 1b is made of plastic in the injection molding process. The injection molding process enables a simple and cost-effective production with simultaneous integration of many partial functions by formation of corresponding construction elements, such as the support elements 10, the groove 15 for the gasket 16, the seating of the lock element 3 or the formation of the joint 2. By designing the housing 1 in plastic as an electrically non-conducting material, it is possible to maintain the required insulation categories despite the compact construction and the direct contact with parts under voltage. The plastic used for this is outfitted with an appropriate fire protection finish.

Figure 9:
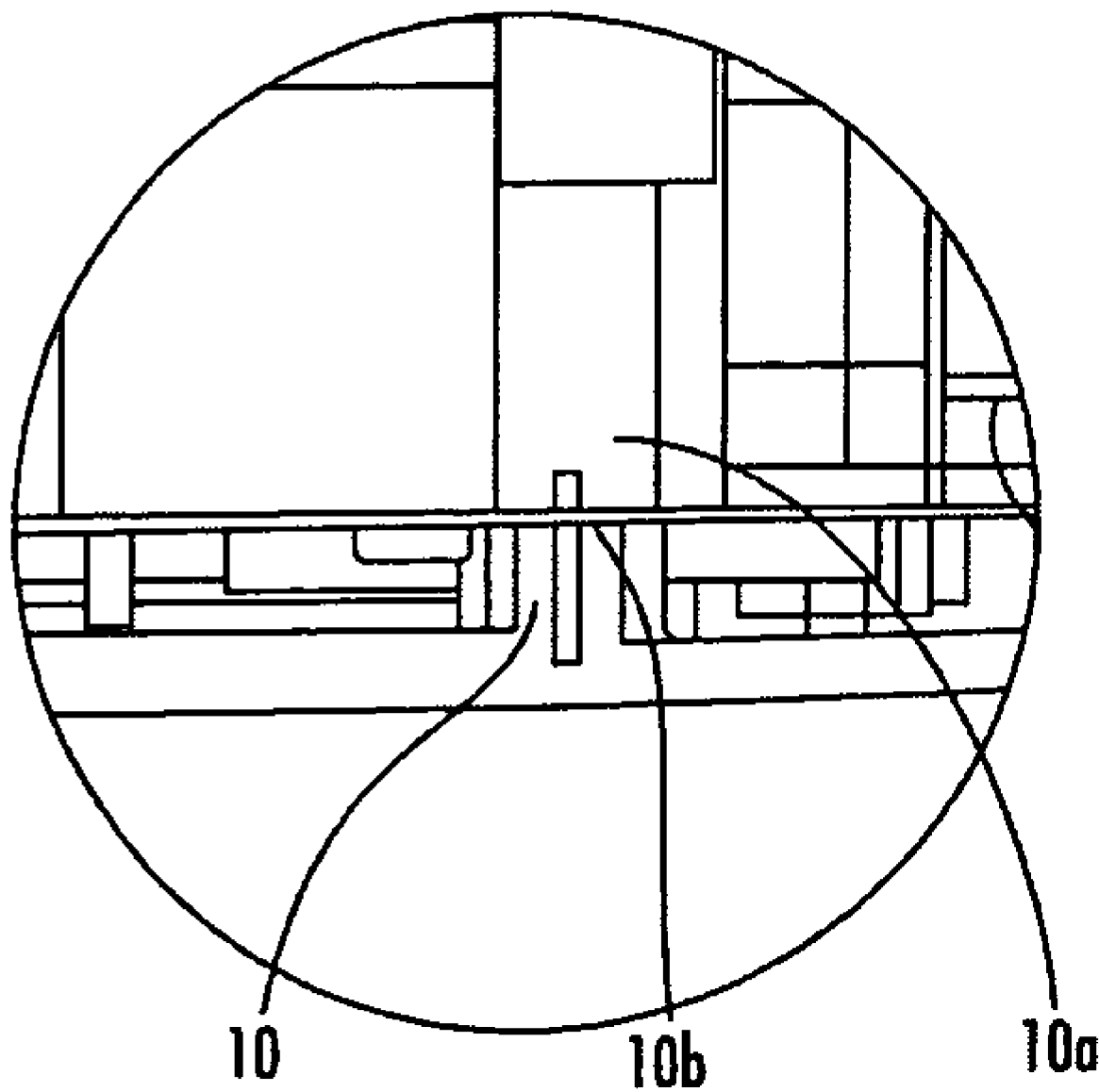
FIG. 9 is an enlarged sectional view of the support element 10.

FIG. 9 represents an enlarged view of the support element 10, including pin-shaped extensions 10a and annular bearing surface 10b.

What is claimed is:

1. An electrical assembly for fastening of power components to a circuit board, comprising:
    at least one chosen from electrical and electronic power components, wherein the power components are mechanically and removably fastened to the circuit board by mechanical fasteners; and
    a first and second group of connection elements, wherein the first group of connection elements is fastened to the circuit board, and the second group of connection elements is included in the power components for their electrical connection, wherein the power components are wired electrically to the circuit board via electrical lines electrically connecting the second group of connection elements with said first group of connection elements, said first group of connection elements comprising at least one chosen from plug and terminal strips arranged on the circuit board, said second group of connection elements comprising at least one chosen from plug and terminal connection elements.

2. The electrical assembly of claim 1 including a plurality of recesses in the circuit board, wherein the power components are mechanically and removably inserted into the recesses and the dimensions of the recesses are adapted to the outer dimensions of the power components.

3. The electrical assembly of claim 2, wherein the power components are held removably by snap connections in the recesses.

4. The electrical assembly of claim 1 including at least one rail on the circuit board, wherein the power components are mechanically and removably fastened to said rail.

5. The electrical assembly of claim 4, wherein the power components are held removably by snap connections to said rail.

6. The electrical assembly of claim 1 including a housing comprising a tub-shaped bottom piece and a tub-shaped cover and wherein said circuit board is arranged in the tub-shaped cover.

7. The electrical assembly of claim 6, wherein said circuit board is supported at least in the region of fastening of the power components to the circuit board by support elements that are connected to the housing.

8. The electrical assembly of claim 7, wherein said support elements are arranged at the inside of a cover plate of the tub-shaped cover of the housing and are pin-shaped, and said circuit board and power components are spaced away from said cover plate of the housing by said support elements.

9. The electrical assembly of claim 6, wherein said cover is movably attached to said tub-shaped bottom piece by a joint and wherein said cover can be removed from the tub-shaped bottom piece via said joint.

10. The electrical assembly of claim 6, wherein at least one plug socket and at least one plug and terminal strip are arranged on said circuit board in said tub-shaped cover, by which said circuit board can be connected to an electronic control and the power components in said tub-shaped bottom piece of the housing and to an electrical load outside the housing.

11. The electrical assembly of claim 10, wherein said at least one plug socket is accessible from outside the housing through an opening in the tub-shaped cover of the housing.

12. The electrical assembly of claim 6, wherein the housing is made from an electrically non-conducting material.

13. The electrical assembly of claim 6, wherein the housing comprises a plastic injection molded piece.

* * * * *